United States Patent [19]

Eggebeen

[11] Patent Number: 4,989,806
[45] Date of Patent: Feb. 5, 1991

[54] TAPE CARTRIDGE HOUSING FASTENER SYSTEM

[75] Inventor: James A. Eggebeen, San Diego, Calif.

[73] Assignee: Gigatek Memory Systems, La Costa, Calif.

[21] Appl. No.: 410,602

[22] Filed: Sep. 21, 1989

[51] Int. Cl.$^5$ .............................................. G03B 1/04
[52] U.S. Cl. .................................... 242/199; 360/132
[58] Field of Search ............... 242/197, 198, 199, 200; 360/132; 24/453

[56] References Cited

U.S. PATENT DOCUMENTS

| | | | |
|---|---|---|---|
| 2,099,655 | 11/1937 | MacFadden | 248/358 |
| 2,745,620 | 5/1956 | Murphy | 248/239 |
| 3,037,596 | 6/1962 | Fordyce | 189/88 |
| 3,120,971 | 2/1964 | Bengtsson | 292/91 |
| 3,153,975 | 10/1964 | Rapata | 85/80 |
| 3,493,990 | 2/1970 | Winn | 16/90 |
| 3,692,255 | 9/1972 | Von Behren | 242/192 |
| 4,012,155 | 3/1977 | Morris | 403/290 |
| 4,457,473 | 7/1984 | Mroz et al. | 242/199 X |
| 4,571,789 | 2/1986 | Morioka | 242/192 X |
| 4,674,703 | 6/1987 | Falk | 242/199 |

FOREIGN PATENT DOCUMENTS 1111742 9/1954 France .
745788 2/1956 United Kingdom .

Primary Examiner—John M. Jillions
Assistant Examiner—William G. Batista, Jr.
Attorney, Agent, or Firm—Brown, Martin, Haller & McClain

[57] ABSTRACT

A fastening system or mechanism for fastening a cover member of a first, resilient material to a base member of a second, relatively rigid material to form a tape cartridge housing comprises a single rigid fastener connected between the base and cover members and at least one expansion or slip fastener rigidly connected to one of the members and loosely connected to the other member in a manner permitting a predetermined degree of relative sliding movement between the members in any direction in the plane parallel to the base and cover members, while restricting perpendicular movement between the members. In the preferred embodiment, the expansion fastener comprises a headed post or screw extending through an enlarged opening in one of the members with some free play and fastened in an opposing bore in the other member.

15 Claims, 3 Drawing Sheets

4,989,806

TAPE CARTRIDGE HOUSING FASTENER SYSTEM

BACKGROUND OF THE INVENTION

The present invention relates generally to a housing for a two spool tape or data cartridge for magnetic recording tape of the type used in computers and the like, and is particularly concerned with an improved fastener mechanism or system for coupling or connecting the opposed lower and upper walls of the housing together.

Typical magnetic tape cartridges include an outer housing and various internal components including tape, a pair of rotatable spools carrying the tape, and a drive mechanism. The housing usually comprises a metallic baseplate and an opposing cover member of plastic material. Where the baseplate and cover member are rigidly secured together, warpage of the housing can occur as a result of the different rates of thermal expansion of the materials forming the baseplate and cover. This warpage results in some deflection of the tape transport path, which is unacceptable in view of the very high track densities on current magnetic data tapes, requiring a high degree of precision in the tape transport.

In U.S. Pat. No. 4,571,789 of Morioka, a fastener mechanism for connecting the baseplate to the cover in a manner allowing for some degree of different relative thermal expansion is described. The mechanism comprises a single rigid fastener between the baseplate and cover which is located on the mid-line of the cartridge, and a series of snap fasteners between the baseplate and cover, one each adjacent each corner of the cartridge. The snap fasteners each have a pair of spring arms separated by a slot which can absorb some of the differential expansion between the baseplate and cover by allowing the arms to move towards and away from each other. However, this arrangement only allows relative motion between the baseplate and cover in one lateral direction, parallel to the front of the baseplate, since the spring arms can only move towards and away from each other in this direction, as permitted by the slot. The snap fasteners are actually quite stiff in the front to rear direction. Additionally, the snap fasteners do not provide a secure connection between the baseplate and cover and thus allow some potential for separation of the baseplate from the cover, especially along the front edge of the cartridge where it contacts the drive mechanism and thus encounters relatively large forces.

SUMMARY OF THE INVENTION

It is an object of this invention to provide an improved fastener mechanism for a tape cartridge housing.

According to the present invention, a tape cartridge housing is provided which comprises a rectangular enclosure comprising an upper wall, a lower wall spaced from the upper wall, and peripheral side, front and rear walls, at least the lower wall comprising a flat base member of rigid material and at least the upper wall comprising a cover member of resilient material, and a fastener mechanism securing the baseplate to the cover member. The fastener mechanism comprises a single rigid fastener connected between the baseplate and cover member and at least one expansion fastener device connected between the baseplate and cover member at a location spaced from the rigid fastener. The expansion fastener device is arranged to allow a small degree of free play between the cover member and baseplate in any lateral direction while restricting movement in a perpendicular direction.

The expansion fastener device may comprise a flexible member secured to opposed positions on the baseplate and cover member, the flexibility of the member being sufficient to permit the desired degree of free play, or relative movement, between the baseplate and cover member in any lateral direction. However, in the preferred embodiment of the invention the expansion fastener device comprises a post or screw having a head at one end and secured to one of the members at the other end, the other member having a slot of slightly larger diameter than the screw or post shaft through which the fastener projects. The clearance between the slot and shaft allows the desired degree of relative motion for absorbing thermal expansions in any lateral direction. At the same time, there is a small vertical clearance between the head of the fastener and the opposing surface of the member through which the shaft projects, to permit the desired lateral movement. The clearance is made as small as possible to restrict movement in the perpendicular direction.

The rigid fastener is preferably provided near the front edge of the cartridge where a tape drive mechanism would contact the cartridge and where most of the force is encountered, to reduce the risk of the cover separating from the base as a result of this force or stress. Preferably, an anti-rotation connection is also provided between the base and cover members, comprising an extension from one of the members towards the other member and an aligned elongated notch in the other member parallel to the front edge of the cartridge for receiving the extension with some free play in a direction parallel to the front edge but restricting rotational movement of the cover member in a direction perpendicular to the front edge of the cartridge. This will constrain the cover member from rotating about the single rigid fastener due to the stress placed on the cover when contacting a tape drive mechanism. Preferably, the anti-rotation connection is provided adjacent a corner of the cartridge.

Preferably, two expansion fastener devices are provided adjacent the corner rollers at the rear corners of the cartridge which act as tape guides. This stabilizes the cover in a vertical plane and aids in retention of the corner rollers.

This arrangement tends to avoid or reduce any mechanical stress or distortion of the cartridge housing arising from the differential thermal expansion rates of the cover and baseplate members, improving the tape transport precision.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
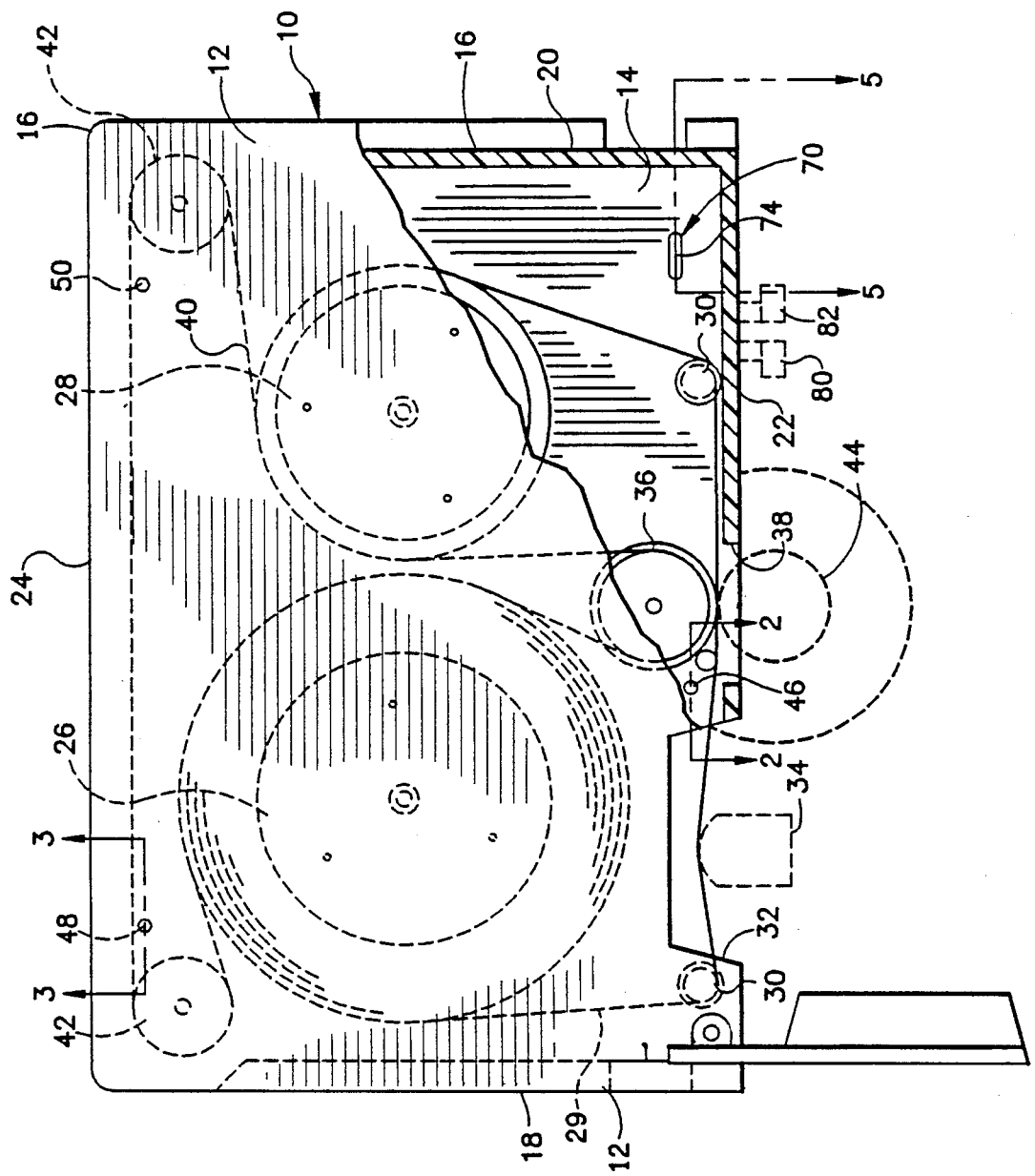
FIG. 1 is a plan view of a tape cartridge housing having a fastener mechanism according to a preferred embodiment of the present invention, with the housing cover partially broken away.

FIG. 1 illustrates a data cartridge 10 having a fastener mechanism according to a preferred embodiment of the present invention. The cartridge 10 includes an outer housing 12 for holding various internal tape guiding and transporting components. The housing includes a flat base member or baseplate 14, which is generally of metal such as aluminum, and a cover member 16 of a transparent, plastic material secured at a predetermined spacing from the baseplate to define a generally rectangular enclosure. Opposite side walls 18 and 20, and front and rear walls 22 and 24, each of which may be formed integrally with the baseplate or cover member, complete the enclosure. In the preferred embodiment illustrated, the side, front and rear walls are all formed integrally with the cover member.

A pair of tape spools 26,28 are rotatably supported on the baseplate for rotation about spaced, parallel axes, and a magnetic recording tape 29 is wound around the tape spools at opposite ends and extends between the tape spools along a predetermined path around various fixed tape guides. The path extends across an opening 32 in the front wall 22 of the cartridge to provide access for a tape head 34.

A tape drive mechanism is also mounted in the cartridge and comprises a belt driving roller 36 mounted adjacent a second opening 38 in the front wall of the housing. A drive belt 40 extends around the driving roller 36 and around belt guide rollers 42 rotatably mounted on the baseplate at the rear corners of the housing so as to contact the tape wound on both spools 26,28 and frictionally drive the tape and spools. The driving roller 36 is driven via drive roller 44 through the opening 38 in the front wall of the housing.

Figure 2:
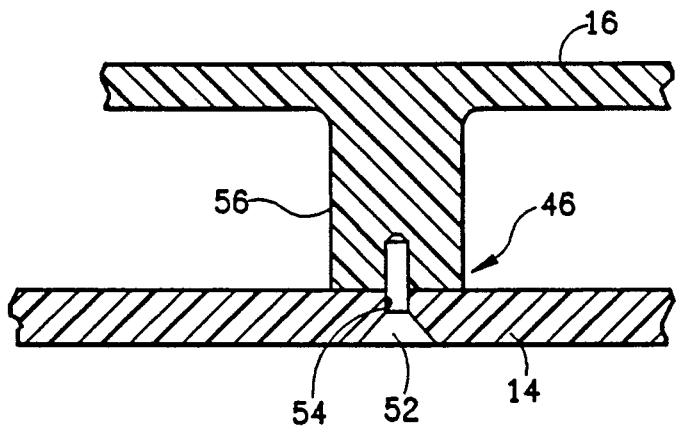
FIG. 2 is an expanded cross-sectional view on the lines 2—2 of FIG. 1 showing one of the parts of the fastener mechanism.

The cover member 16 is secured to the baseplate 14 via a fastening mechanism comprising a single rigid fastener 46 located adjacent the front wall of the housing and a pair of slip or expansion fasteners 48,50 located adjacent the respective rear corners of the housing. Any suitable rigid fastener may be used, but in the preferred embodiment illustrated fastener 46 comprises a countersunk screw 52 which extends through opening 54 in the baseplate and engages in a boss 56 which extends from the cover member to the baseplate, as best illustrated in FIG. 2.

Figure 3:
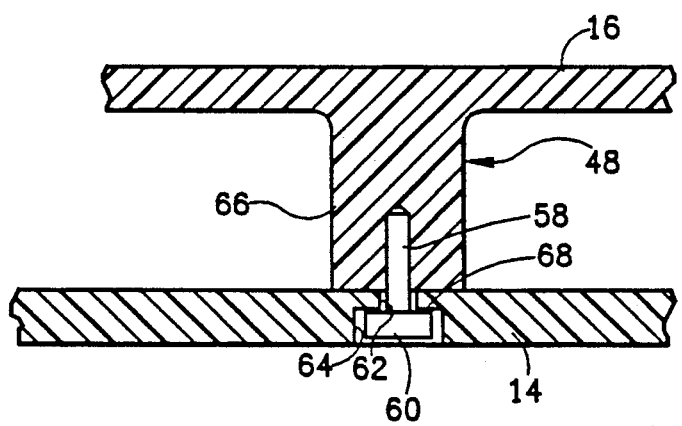
FIG. 3 is an expanded cross-sectional view on the lines 3—3 of FIG. 1 showing another part of the fastener mechanism.
Figure 4:
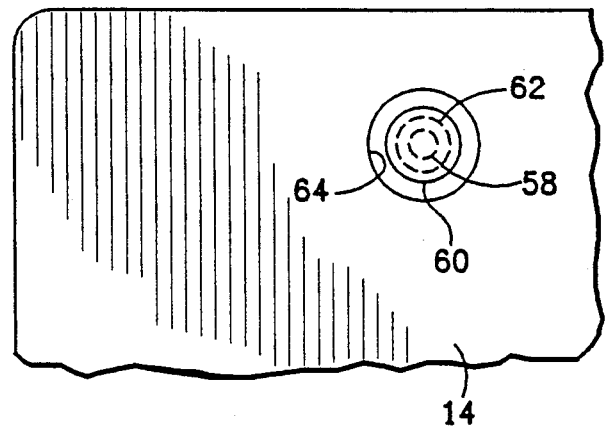
FIG. 4 is a bottom plan view of part of the baseplate of the housing.

The slip or expansion fasteners 48 and 50 are each designed to allow a predetermined limited amount of free play between the cover member and baseplate in any lateral direction while limiting transverse movement or separation of the baseplate and cover member. In the preferred embodiment, as best illustrated in FIG. 3, each fastener 48,50 comprises a plastic post 58 having an enlarged head 60 at one end. The post extends through an opening 62 in the baseplate and is a snap or press fit into a boss 66 which extends from the cover member to the baseplate. The opening 62 is of slightly larger diameter than the post 58 to permit the baseplate to slide in all directions transverse to the post to a distance equal to the spacing between the outer periphery of the opening 62 and the post. This distance is determined according to the maximum expected thermal expansion differential between the cover member and baseplate, and is preferably no less than 0.002 inches. The head 60 of the post is countersunk in counterbore 64, which is also of larger diameter than head 60 to permit the desired degree of lateral sliding movement.

The relative lengths of the post and corresponding bore in boss 66 are such that there is a small gap or clearance 68 between the head 60 and counterbore 64 when the post is fully inserted, to permit the desired 360 degrees of freedom of sliding movement in the plane of the cartridge baseplate. As an alternative to the press fit post, a screw fastener may be used with the screw being first tightened and then loosened slightly to provide gap 68 permitting the desired sliding lateral movement. The gap is preferably of less than 0.001 inches to allow very limited movement in the plane perpendicular to the cartridge baseplate. If desired, a high lubricity washer may be inserted in the gap 68 so that substantially no motion of the baseplate relative to the cover member in the perpendicular or transverse direction is permitted. In an alternative arrangement, a plastic snap fastener having some flexibility in all directions may be used to connect the cover member to the baseplate at the rear corners of the housing.

A greater number of slip or expansion fasteners may be provided if desired. This fastening mechanism permits the thermal expansion of the cover member to be substantially or completely de-coupled from the baseplate, since any differential thermal expansions can be absorbed between the post or screw fastener 58 and opening 62 allowing sliding movements of portions of the cover relative to the baseplate in a plane parallel to the baseplate. At the same time, the slip fasteners provide positive retention of the cover member in a vertical plane or plane perpendicular to the baseplate, resisting separation of the cover from the baseplate along its edges. Only a very limited degree of movement of the cover away from the baseplate is permitted by gap 68,, preferably less than 0.001 inches.

Figure 5:
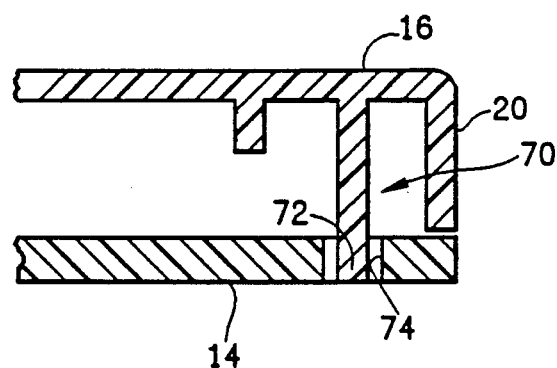
FIG. 5 is a cross-sectional view on the lines 5—5 of FIG. 1 illustrating the anti-rotation device.
Figure 6:
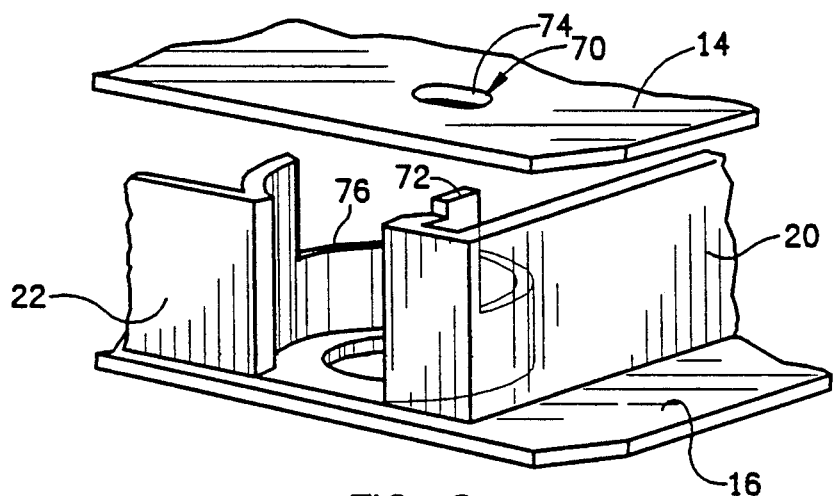
FIG. 6 is an exploded perspective view of a corner of the housing, with the cover and baseplate separated, illustrating the location of the anti-rotation device.

An anti-rotation device 70, as illustrated in FIGS. 5 and 6, is provided between the cover member and baseplate adjacent one of the front corners of the housing to constrain the cover from rotating about the single rigid fastener 46 due to the stress placed on the cover when contacting the tape drive mechanism. In the preferred embodiment, as best illustrated in FIGS. 5 and 6, the device 70 comprises an extension or tongue 72 projecting from the cover member into an aligned groove or notch 74 in the baseplate, with the notch being elongated or longer than the tongue 72 in a direction parallel to the front wall of the housing so as to permit lateral movement of the cover in that direction without binding, while preventing or restricting any front to rear rotational movement of the cover. In the embodiment illustrated, the tongue is provided as a downward projection from the periphery of a standard write lockout knob retaining cylinder 76 projecting downwardly from the cover member. In one specific example, the tongue thickness in the direction parallel to the front of the housing was of the order of 0.051 inches while the length of slot 74 was 0.162 inches to permit the desired free play in that direction. The width of the slot was around 0.101 inches while the width of the tongue was 0.100 inches permitting substantially no front to rear sliding movement at the location of the anti-rotation device.

The fastening system illustrated provides the desired degree of rigidity to the cartridge housing in the plane of movement perpendicular to the cover and baseplate, while permitting a predetermined amount of relative lateral movement between the cover member and baseplate as a result of differential thermal expansion rates of the two members. This will prevent or substantially reduce any mechanical stress or distortion. The location of the rigid fastener adjacent the front wall of the cartridge is preferred since this is the location where most of the force is encountered due to contact with the external tape drive mechanism. The rigid fastener will resist the tendency of the cover to separate from the baseplate along the front edge.

The tendency of the cover to rotate as a result of contact of the front wall of the cover with two external switches 80,82 (See FIG. 1), causing a torsional force, is resisted by the anti-rotation tongue in slot device which is preferably located as illustrated adjacent one of the front corners of the housing to provide the maximum moment arm.

The slip fasteners are also preferably located as illustrated, adjacent the corner rollers at the rear of the cartridge, since they can then resist any tendency for the cover to separate from the baseplate along the rear of the cartridge and also aid in retention of the corner rollers.

Although a preferred embodiment of the invention has been described above by way of example only, it will be understood by those skilled in the field that modifications may be made to the disclosed embodiments without departing from the scope of the invention, which is defined by the appended claims.

I claim:

1. A tape cartridge housing for housing a data tape and tape drive assembly, comprising:
   a rectangular enclosure comprising an upper wall, a lower wall spaced from the upper wall, and peripheral side, front and rear walls;
   at least the lower wall of the enclosure comprising a flat, rigid base member;
   at least the upper wall of the enclosure comprising a cover member of resilient material; and
   securing means for securing the cover member to the base member, the securing means comprising a single fixed fastener comprising means for rigidly connecting a first point on the cover member to a second, opposing point on the base member to restrict relative lateral movement in any direction between said opposing points, and at least one expansion fastener connected between the cover member and base member at a location spaced from said fixed fastener, said expansion fastener comprising means for allowing a limited amount of relative lateral movement in any direction between the base member and cover member at that location as a result of different thermal expansion rates of said base member and cover member.

2. The housing as claimed in claim 1, wherein each expansion fastener comprises a post member having a head at one end and a reduced diameter shaft projecting from the head, one of said cover and base members having an opening of slightly larger diameter than said shaft through which said shaft projects, and the other of said cover and base members having a boss projecting towards and aligned with said opening, said boss having retaining means for retaining said shaft, the opening and shaft being of predetermined relative diameters to permit a predetermined amount of relative lateral movement between the cover and base members.

3. The housing as claimed in claim 2, wherein the difference in diameter between the opening and the shaft is no less than 0.002 inches.

4. The housing as claimed in claim 2, wherein a gap is provided between the head of the post member and the adjacent surface of the member through which the post member projects when the shaft is fully engaged in the opposing boss for permitting said relative lateral movements.

5. The housing as claimed in claim 4, wherein said gap is of thickness no greater than 0.001 inches.

6. The housing as claimed in claim 2, wherein said boss has a bore and said shaft is a press fit in said bore.

7. The housing as claimed in claim 2, wherein said post comprises a screw and said boss has a correspondingly screw threaded bore.

8. The housing as claimed in claim 1, wherein said fixed fastener is provided adjacent the front wall of said housing.

9. The housing as claimed in claim 1, further including anti-rotation means between said cover and base members for resisting rotation of said cover member about said fixed fastener, said anti-rotation means comprising a tongue projecting from one of said members, the other member having a slot for receiving said tongue.

10. The housing as claimed in claim 9, wherein said slot is of larger dimensions than said tongue in a direction parallel to the front wall of the housing to permit lateral movement in that direction but restrict front to rear rotational movement of the cover member relative to the base member.

11. The housing as claimed in claim 10, wherein said fixed fastener is located adjacent the center of the front wall of the housing and the anti-rotation means is located adjacent one front corner of the housing.

12. The housing as claimed in claim 11, wherein a pair of expansion fasteners are provided, the expansion fasteners being located at spaced positions adjacent the rear wall of the housing.

13. The housing as claimed in claim 12, wherein belt guide rollers are rotatably mounted on the base member adjacent the rear corners of the housing, and the expansion fasteners are located adjacent the respective rear corner rollers.

14. A tape cartridge housing for housing a data tape and tape drive assembly, comprising:
   a generally rectangular enclosure comprising an upper wall, a lower wall, and peripheral side, front and rear walls;
   at least the lower wall of the enclosure comprising a flat base member of a material having a first thermal expansion rate;
   at least the upper wall of the enclosure comprising a cover member of a material having a second, different thermal expansion rate;
   a single fixed fastener rigidly connected between a first point on the base member and a second, opposed point on the cover member, the fixed fastener comprising means for restricting lateral movement in any direction between said opposing points; and at least one expansion fastener rigidly connected at one end to one of the members at a location spaced from the fixed fastener and loosely connected at the other end to an opposing location on the other member, the loose connection comprising means for allowing a predetermined amount of relative sliding movement of said members at said opposed locations in any direction parallel to the plane of said members, said expansion fastener further including means for restricting relative movement in a direction perpendicular to the plane of said members.

15. The housing as claimed in claim 14, further including anti-rotation means between said cover and base members for restricting rotation between said members, said anti-rotation means comprising a rigid tongue projecting from one of said members, the other member having a rigid-sided slot for receiving said tongue for allowing relative sliding movement along the slot but restricting relative rotational movement between said members.

* * * * *